United States Patent [19]
Nordgård

[11] 3,875,058
[45] Apr. 1, 1975

[54] PURIFYING APPARATUS FOR PURIFYING CONTAMINATED WATER

[75] Inventor: Sigvard Nordgård, Saltsjobaden, Sweden

[73] Assignee: Sanaqua SA, Geneva, Switzerland

[22] Filed: Nov. 20, 1972

[21] Appl. No.: 307,901

[30] Foreign Application Priority Data
Nov. 25, 1971 Sweden.............................. 1511/71

[52] U.S. Cl.................... 210/151, 210/242, 261/92
[51] Int. Cl............................................. B01d 33/34
[58] Field of Search ...... 210/242, DIG. 21, 83, 526, 210/64, 65, 304, 121, 150, 151; 261/92

[56] References Cited
UNITED STATES PATENTS

| 763,327 | 6/1904 | Roche................................. 210/242 |
| 3,447,683 | 6/1969 | Luce, Jr............................... 210/83 |
| 3,563,383 | 2/1971 | Hellquist......................... 210/242 X |
| 3,618,768 | 11/1971 | Brown................................. 210/242 |
| 3,688,905 | 9/1972 | Nordgard........................... 210/151 |
| 3,779,911 | 12/1973 | Freudenthal....................... 210/151 |

FOREIGN PATENTS OR APPLICATIONS
1,314,495 12/1962 France......................... 210/DIG. 21

*Primary Examiner*—Theodore A. Granger
*Attorney, Agent, or Firm*—Sughrue, Rothwell, Mion, Zinn and Macpeak

[57] ABSTRACT

Water purifying apparatus has a cylindrical casing rotatably supported in a tank containing contaminated water. The casing contains a helical baffle and is rotated so that contaminated water flowing in through one end of the casing is displaced to an outlet at the other end by the helical baffle and thereby brought into contact with microorganisms on the helical baffle, and the apparatus is provided with a buoyancy jacket or pontoons for buoyantly supporting the apparatus on the contaminated water.

10 Claims, 6 Drawing Figures

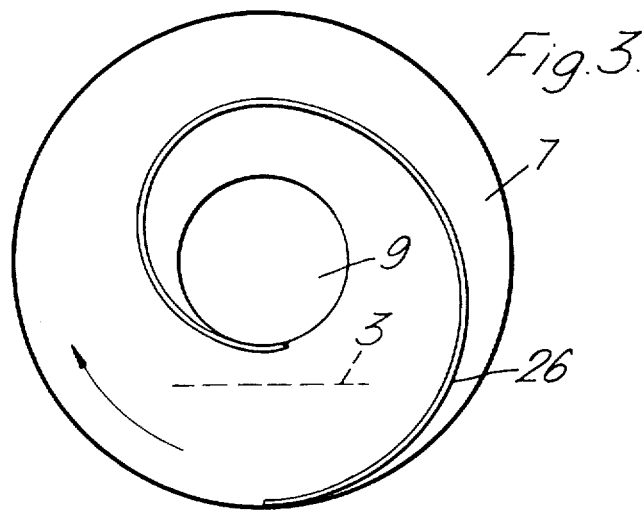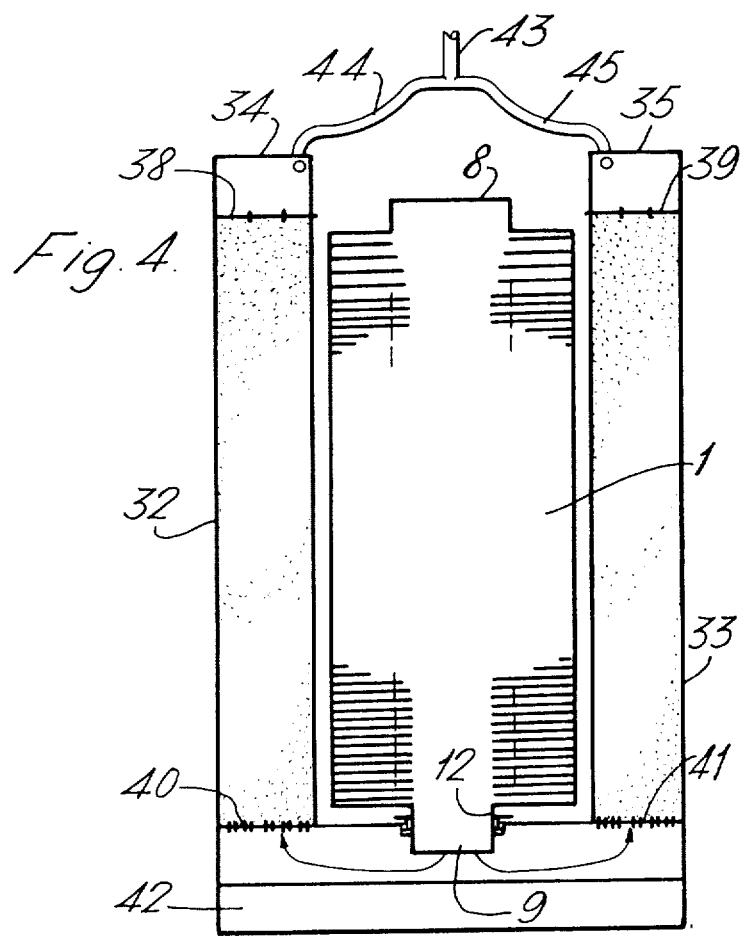

PURIFYING APPARATUS FOR PURIFYING CONTAMINATED WATER

The present invention relates to a purifying apparatus for purifying contaminated water.

One previously known purifying apparatus has a cylindrical casing to the ends of which a first and a second end wall unit are connected, an inlet being provided in the first end wall unit and an outlet in the second end wall unit, the interior of the casing containing at least one helical element which is joined to the casing and the surfaces of which carry layers of biologically active microorganisms, drive means being provided to impart rotational movement to the casing about the longitudinal axis thereof.

This prior purifying apparatus is highly effective but has the drawback theat relatively only small apparatus can be built without the structure supporting the casing becoming too complicated and expensive. These support structures must be dimensioned for a maximum of load corresponding to layers of microorganisms of a maximum thickness and a maximum quantity of water within the casing.

Another drawback of this prior purifying apparatus is that the capacity i.e. the quantity of water flowing through the apparatus per unit time, is reduced as the thickness of the layers of microbes increases.

It is an object of the present invention to provide a purifying apparatus having an improved arrangement for supporting a rotatable cylindrical casing.

According to the present invention, a purifying apparatus for purifying contaminated water comprises a cylindrical casing having an inlet at one end and an outlet at the other end and containing at least one helical baffle for displacing the water through the casing from the inlet to the outlet on rotation of the casing. Buoyancy means, for example a buoyancy jacket around the casing or pontoons, are provided for floatingly supporting the casing on the contaminated water, so that the apparatus can adapt to variations of the level of the contaminated water and of the weight of the casing as microorganisms build up within the casing. Bearing means for supporting the casing for rotation about its longitudinal axis may be mounted on the buoyancy means or on a tank containing a body of the contaminated liquid, and means may be provided for allowing vertical pivotation of the casing about the outlet end of the casing.

Further features, advantages and objects of the present invention will be apparent to those skilled in the art from the following description of the present invention, given by way of example and not limitation, with reference to the accompanying diagrammatic drawings, in which:

FIG. 1 in a simplified manner shows one embodiment of the invention,

FIG. 3 is a section following the line III—III of FIG. 1,

FIG. 4 shows a modified embodiment of the invention,

Figure 1:
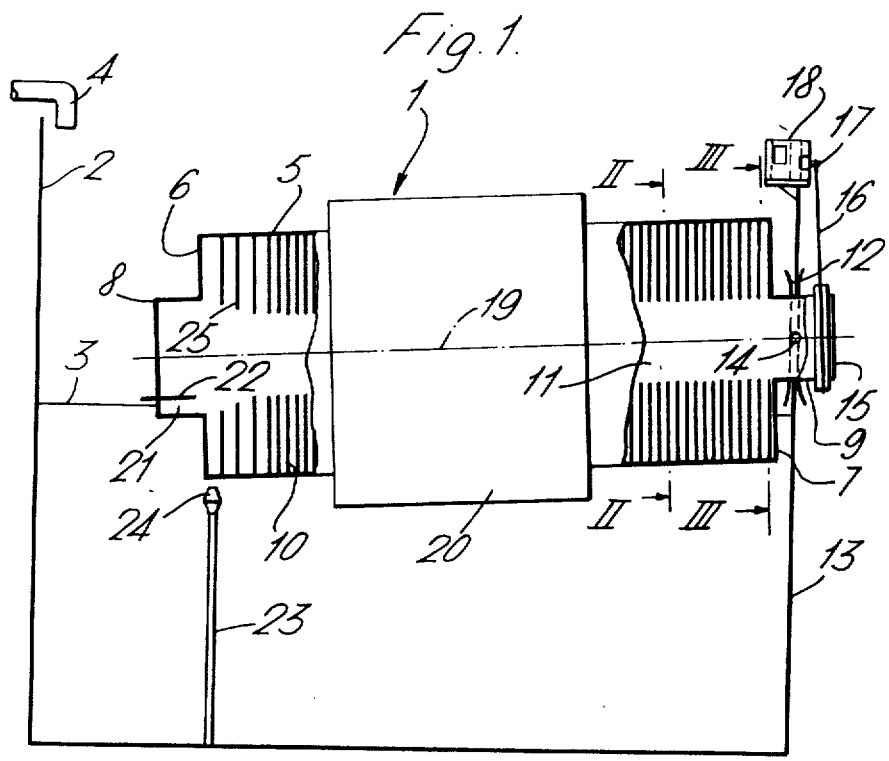

FIG. 1 shows diagrammatically a purifying apparatus indicated generally by reference numeral 1 partially immersed in contaminated water, for example sewage water in tank 2. The level or surface of the water is indicated by reference numeral 3. The water is supplied to the tank 2 by means of a conduit 4 and the level 3 is kept constant by means of control means (not shown).

The purifying apparatus 1 includes a water-tight outer cylindrical wall or casing 5 having end walls 6 and 7. In the illustrated embodiment, a tubular inlet 8 for contaminated water is centrally arranged on the end wall unit 6. A central, tubular outlet 9 is provided on the opposite end wall unit 7.

A helical baffle element 10 is connected to the inner face of the casing or cylindrical wall 5. Extending centrally through the entire helical element 10 there is a channel 11 for the supply of air for aerating the sewage water and activating microbes on the surfaces of the disc element. Instead of this channel there may be provided a central tubular casing supporting the helical element 10 and formed with holes for discharging air.

The tubular outlet 9 is rotatably mounted in a support means in the form of a bearing unit 12 fitted in one lateral wall 13 of the tank 2 and of such a type that the tubular outlet 9 is swingable within the bearing 12 about a horizontal axis 14 extending at right angles to the plane of FIG. 1. The tubular outlet 9 is further provided with a pulley 15 for a belt 16 passing over a pulley 17 on the shaft of a motor 18. When the motor 18 is in operation, the entire purifying apparatus 1 will thus be driven about its central axis 19 by the motor 18, and sewage water taken in through the inlet 8 will be pumped through the helically formed continuous purifying channel formed by the threads of the helical element 10.

The purifying apparatus 1 is further provided with a buoyancy element comprising an external float 20 in the form of a cylinder or jacket extending around the casing 10. This float 20 is dimensioned so as to permit the whole apparatus 1 to swing about the horizontal bearing axis 14 to force the lower portion 21 of the inlet 8 below the water surface 3 when the apparatus has its lowest weight, i.e. when the layers of microbes are entirely lacking or being formed on the surfaces of the helical element 10.

As the layers of microbes are increased to a relatively exactly determined maximum thickness during operation of the apparatus, the weight of the apparatus 1 will be increased and thereby the apparatus will be forced to swing downwards at its inlet end and the inlet area will be increased. Represented in FIG. 1 is the upper edge 22 of the inlet area, i.e. that edge which coincides with the water level 3 in the position of the maximum downwards swinging movement of the apparatus 1. In the embodiment shown in FIG. 1, the lowermost position is defined by a stop member 23 against which the casing bears. The stop member is provided with one or several upper idle rollers, for example the roller 24, to reduce the friction between the casing 1 and the stop member 23.

Since an increase of the water level inside the inlet portion of the casing is brought about as the weight of the apparatus 1 is increased, the liquid pressure at the inlet will also be increased and thereby more sewage water will be supplied when the helix 10 of the apparatus has thick layers of microbes on the surfaces of its threads. The reduced throughflow area between the threads of the helix is thus compensated entirely or partially by an increased pressure and thereby higher speeds of through-flow. The increased speed of throughflow does not result in any reduction of the purifying effect since the dirt particles in the contaminated water are imparted a higher kinetic energy and therewith more easily penetrate into the layers of microbes.

In order further to increase the capacity of the apparatus, a pump means is provided to bring about an increase of the water level within the apparatus when the latter occupies its highest position. In the simplest case, the pump means may consist of the first thread or threads 25 of the helical element 10, which are given a greater pitch than the subsequent threads and consequently receive larger quantities of water between them than the subsequent threads. Due to the pumping effect of the helix the water level in the inlet portion of the apparatus will be raised to the level 22 and as a consequence the largest possible quantity of water will pass through the apparatus.

As the sewage water is advanced in a helical movement or pumped through the space between the threads, a biological purification is effected and the purified water finally reaches the end wall unit 7. As will be seen from FIG. 3, the end wall unit 7 is provided on its inner side with a simple pump means having the shape of a spirally curved strip or plate 26 which, when the apparatus is rotated in the direction of the arrow represented in FIG. 3, pumps up to the outlet 9 water which reaches e.g. the water level 3. In the illustrated embodiment of the invention, the outlet tube 9 extends outwards through the wall 13 of the tank 2. This pump means 26 is provided between the outlet end of the helical element 10 and the outlet 9.

Figure 2:
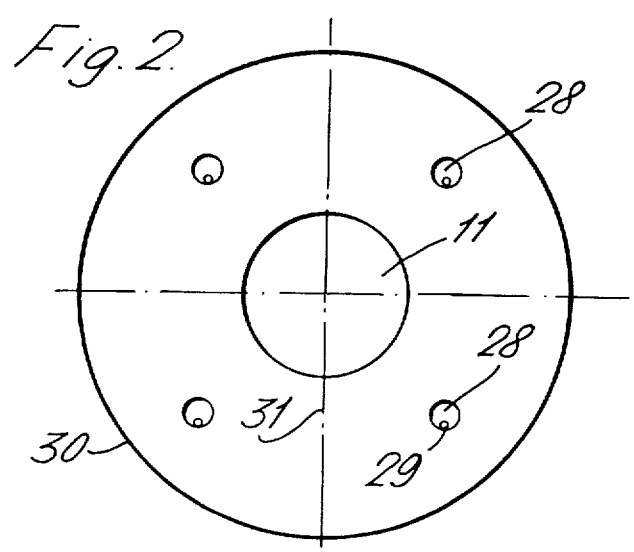
FIG. 2 is a section following the line II—II of FIG. 1.

To permit flow not only through the helically formed space between the threads of the helical element but also through these threads, holes 28 may be formed in each thread as is shown in FIG. 2. To prevent the holes 28 from becoming clogged by microbes, these holes, in the threads under consideration are preferably aligned with one another in all of these threads, and a metal bar 29 of considerably smaller diameter than that of the holes extends through the aligned holes. The bar preferably extends along the entire length of the casing 5 and during rotation of the casing rotates within the holes 28 and maintains them entirely unblocked.

A pump means similar to the pump means 26 shown in FIG. 3 may also be used as a pump means at the inlet to the purifying apparatus.

The inlet end wall unit 6 may be constituted by any outer thread of the helix which is sealingly connected at its circumference 30 (FIG. 2) to the casing wall 5. The inlet 8 will then be constituted by the thread entrance 31. A corresponding end wall unit may be provided at the outlet end, but preferably the outer portion of the thread exit is closed in order to make sure that the outlet will be located above the water level 3.

FIG. 4 shows in a simplified manner an apparatus 1 which is of the same kind as that described hereinbefore, and which is suspended from, and mounted swingable relatively to, a float. The apparatus and the float on a water surface extending in parallel to the plane of the drawing figure.

The float consists of two open-topped, but otherwise water-tight, pontoons or channel-shaped bodies 32 and 33, respectively, with end closures 34, 35 at one end. Small mesh nettings 38, 39, 40, 41 are provided at the other ends of the pontoons and each pontoon contains activated carbon or some other suitable substance for final purification of the water pumped out from the purifying apparatus 1. At the outlet side of the apparatus 1 the pontoons or channel-shaped bodies are interconnected by means of a connection pontoon and a floating tank 42 to keep the outlet 9 above the water surface.

Purified water from the outlet 9 flows in the direction of the arrows shown in FIG. 4 to the channel-shaped bodies 32, 33 and through them to an outlet 43 connected to the channel-shaped bodies by flexible hoses 44, 45, which enable the outlet to be stationary and e.g. fixed to a tank wall or attached to a fixed conduit.

The float or floats of the purifying apparatus 1 for keeping the apparatus 1 floating in the water and swingable about a horixontal axis in the bearing unit are not shown in FIG. 4. However it is to be understood that an annular float of the same kind as the float 20 of FIG. 1 may be provided. Some buoyancy is also obtained by manufacturing the helical disc element 10 of e.g. rigid, foamed plastic having closed cells. Further, the lateral wall 5 of the casing may be made with double walls and include a water-tight space having sufficient volume to keep the purifying apparatus floating in a desired position.

Figure 5:
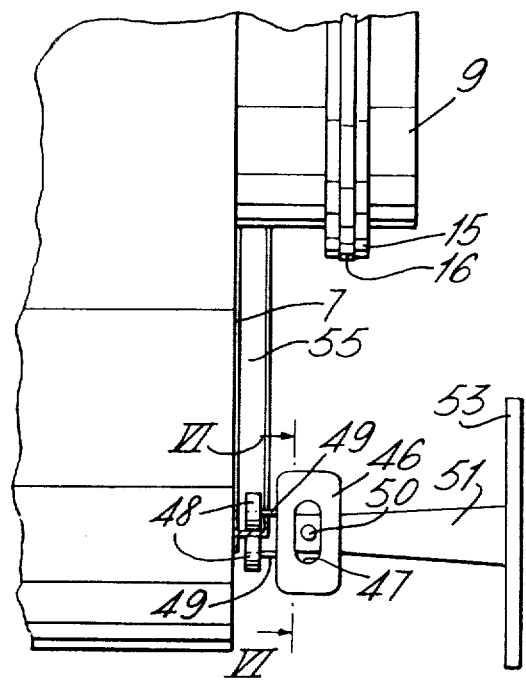
FIG. 5 shows a detail of a bearing unit.
Figure 6:
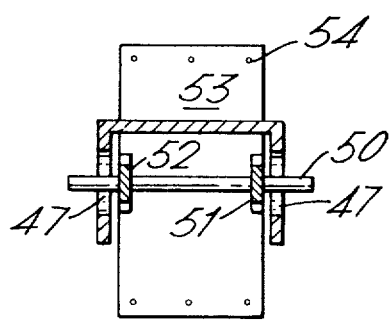
FIG. 6 is a section following the line VI—VI of FIG. 5.

FIGS. 5 and 6 show a suitable bearing unit which may be used for the swingable suspension of the purifying apparatus. The bearing unit includes an inverted U-shaped bracket 46 haivng in each of its side walls a vertical slot 47. A substantially horizontal shaft 50 extends through the slots 47 and is journaled at its ends in arms 51, 52, which are fixed on a support plate 53 having holes 54 for bolts. The support plate is mounted on the tank wall in the embodiment of FIG. 4. Rollers 48, which are freely rotatable about roller shafts 49 fixed to the bracket, engage opposite sides of a flanged annular roller track 55, which is fixedly bolted to the end wall 7 of the casing 5.

The bearing unit is shown in FIGS. 5 and 6 in a position which it occupies when the purifying apparatus is lightly loaded, i.e. when the layers of microorganisms are relatively thin. The floats of the purifying apparatus are dimensioned so that the outlet end of the apparatus is kept in a position such that the bearing unit is not loaded, in which position the shaft 50 extends through the slots 48, 49 without contact with their walls. When the weight of the apparatus has increased to a predetermined value and the apparatus has gone down to a corresponding extent, but not before then, the upper edge of the slots 48, 49 will come into contact with the shaft 50 and a load is transferred to the bearing unit. A bearing unit of this type is especially suitable when the purifying apparatus is suspended in a float, which consequently can be given less displacement.

The illustrated embodiments of the invention may be modified in various respects within the scope of the present invention. The helical element 10 may for example be formed as a helix having a plurality of inlets, whereby an increase or capacity is obtained. The float or floats mounted on the lateral wall 5 of the casing may be formed so that the swinging movement of the purifying apparatus about the horizontal axis of the bearing unit becomes a desired function of changes in weight of the apparatus. The illustrated bearing unit proper may be of any type which permits a swinging movement in a vertical plane and may e.g. consist of a ball bearing permitting swinging movements in all directions, in which case guide members are preferably provided to prevent the apparatus from swinging in a horizontal plane.

I claim:

1. A purifying apparatus for purifying contaminated water, said apparatus comprising:

a rotatable cylindrical casing;

means for rotatably supporting said cylindrical casing for rotation about the longitudinal axis of said cylindrical casing;

drive means for rotating said cylindrical casing about said longitudinal axis;

an inlet at one end of said cylindrical casing for entry of the contaminated water into said cylindrical casing; an outlet at the other end of said cylindrical casing for discharge of the contaminated water from said cylindrical casing;

helical baffle means extending longitudinally of the interior of said cylindrical casing and fixed to said cylindrical casing for displacing the contaminated water along said cylindrical casing from said inlet towards said outlet in contact with microorganisms on said helical baffle means on rotation of said cylindrical casing;

float means associated with said cylindrical casing for floatingly supporting said cylindrical casing on a body of said contaminated water, such that said support means supports said cylindrical casing on said float means;

a filter material at least partly filling said float means; and means at the outlet end of said helical baffle means for discharging water from said cylindrical casing into said float means, and means defining an outlet for the water from said float means.

2. A purifying apparatus as defined in claim 1, further comprising pump means provided at said inlet for maintaining a flow of contaminated water through said inlet into said cylindrical casing.

3. A purifying apparatus as defined in claim 2, wherein said helical baffle means has an inner periphery spaced radially outwardly of the longitudinal axis of said cylindrical casing, whereby an air passage is provided along said axis.

4. A purifying apparatus as defined in claim 1, wherein said helical baffle includes a helical pumping means at the inlet end of said cylindrical casing for maintaining a flow of water through said inlet into said cylindrical casing, said helical pumping means comprising helical turns which are more widely spaced apart from one another than adjacent turns of said helical baffle means.

5. A purifying apparatus as defined in claim 1, further comprising pump means between said outlet and the end of said helical baffle means nearest said outlet for pumping water from said helical baffle means through said outlet.

6. A purifying apparatus as defined in claim 1, wherein said helical baffle means has means defining openings in the turns thereof.

7. A purifying apparatus as defined in claim 6, wherein a plurality of said openings are mutually aligned, and further comprising a rod extending through said openings, said rod having a diameter smaller than said openings and being movable in said openings on rotation of said cylindrical casing.

8. A purifying apparatus as defined in claim 1, wherein said support means include means for allowing limited vertical movement of the outlet end of said cylindrical casing.

9. A purifying apparatus as defined in claim 1, wherein said float means comprises two open-topped pontoons disposed at opposite sides of said cylindrical casing.

10. A purifying apparatus as defined in claim 1, wherein said helical baffle means has an inner periphery spaced radially outwardly of the longitudinal axis of said cylindrical casing, whereby an air passage is provided along said axis.

* * * * *